(12) United States Patent
Hammerich et al.

(10) Patent No.: US 7,770,103 B2
(45) Date of Patent: Aug. 3, 2010

(54) CAPTURING DATA OF PREDEFINED TYPE FROM USER

(75) Inventors: Reiner Hammerich, Rauenberg (DE); Ulf Fildebrandt, Schwetzingen (DE)

(73) Assignee: SAP AG, Walldorf (DE)

( * ) Notice: Subject to any disclaimer, the term of this patent is extended or adjusted under 35 U.S.C. 154(b) by 416 days.

(21) Appl. No.: 10/760,135

(22) Filed: Jan. 16, 2004

(65) Prior Publication Data
US 2004/0172598 A1 Sep. 2, 2004

Related U.S. Application Data

(63) Continuation-in-part of application No. PCT/EP02/06519, filed on Jun. 13, 2002.

(60) Provisional application No. 60/305,809, filed on Jul. 16, 2001.

(51) Int. Cl.
G06F 17/40 (2006.01)
G06F 17/30 (2006.01)

(52) U.S. Cl. .................... 715/234; 715/255; 707/103 R; 707/103 Y; 707/103 X; 707/103 Z

(58) Field of Classification Search ................ 715/507, 715/253, 523, 234, 255; 719/316; 707/103 R, 707/103 Y, 103 X, 103 Z
See application file for complete search history.

(56) References Cited

U.S. PATENT DOCUMENTS

| | | | | |
|---|---|---|---|---|
| 5,815,415 A | * | 9/1998 | Bentley et al. .................. | 703/4 |
| 6,167,523 A | | 12/2000 | Strong | |
| 6,311,187 B1 | * | 10/2001 | Jeyaraman .................... | 707/10 |
| 6,453,356 B1 | * | 9/2002 | Sheard et al. ................ | 709/231 |
| 6,643,652 B2 | * | 11/2003 | Helgeson et al. .............. | 707/10 |
| 6,654,932 B1 | * | 11/2003 | Bahrs et al. .................. | 715/507 |

(Continued)

FOREIGN PATENT DOCUMENTS

EP   0499404 A2   8/1992

(Continued)

OTHER PUBLICATIONS

Dianna Leech, Server-Side Form Validation, Mar. 3, 2000, 4GuysFromRolla.com, pp. 1-4, http://web.archive.org/web/20000303025543/http://www.4guysfromrolla.com/webtech/120199-1.shtml.*

(Continued)

Primary Examiner—Stephen S Hong
Assistant Examiner—Wilson Tsui
(74) Attorney, Agent, or Firm—Fountainhead Law Group P.C.

(57) ABSTRACT

Methods and apparatus, including computer program products, for capturing data of a predefined type from a user. The techniques include sending a markup language page to a browser on a client; interpreting the markup language page by the browser to receive data from the user in a transfer format; transferring the data in the transfer format to an object on a server; storing the data by the object in the transfer format; converting the data from the transfer format to a process format by the object; checking the compliance of the data with a predefined rule by the object; and if the data complies with the predefined rule, forwarding the data in the process format by the object to the application; else, resending the markup language page to the browser with the data in the transfer format.

21 Claims, 10 Drawing Sheets

U.S. PATENT DOCUMENTS

| | | | |
|---|---|---|---|
| 6,757,900 B1 * | 6/2004 | Burd et al. | 719/316 |
| 6,981,215 B1 * | 12/2005 | Lindhorst et al. | 715/530 |
| 2001/0034771 A1 * | 10/2001 | Hutsch et al. | 709/217 |
| 2006/0059107 A1 * | 3/2006 | Elmore et al. | 705/64 |

FOREIGN PATENT DOCUMENTS

| | | |
|---|---|---|
| WO | 98/44695 A | 10/1998 |
| WO | 00/34860 A | 6/2000 |

OTHER PUBLICATIONS

James Goodwill, "Pure Java Server Pages", Published: Jun. 8, 2000, Sams, pp. 1-4, 1a, 2a, 3a, 4a, G1.*

Jeff Prosise, "ASP.NET: Web Forms Let You Drag and Drop Your Way to Powerful Web Apps", published: May 2001, pp. 1-28.*

Bryan, Y., "Creating HTML Forms," SGML and HTML Explained, XX, XX, Jan. 1997, pp. 209-220, XP000853514.

International Search Report (from a corresponding foreign application), PCT/EP02/06519, dated Sep. 7, 2003.

* cited by examiner

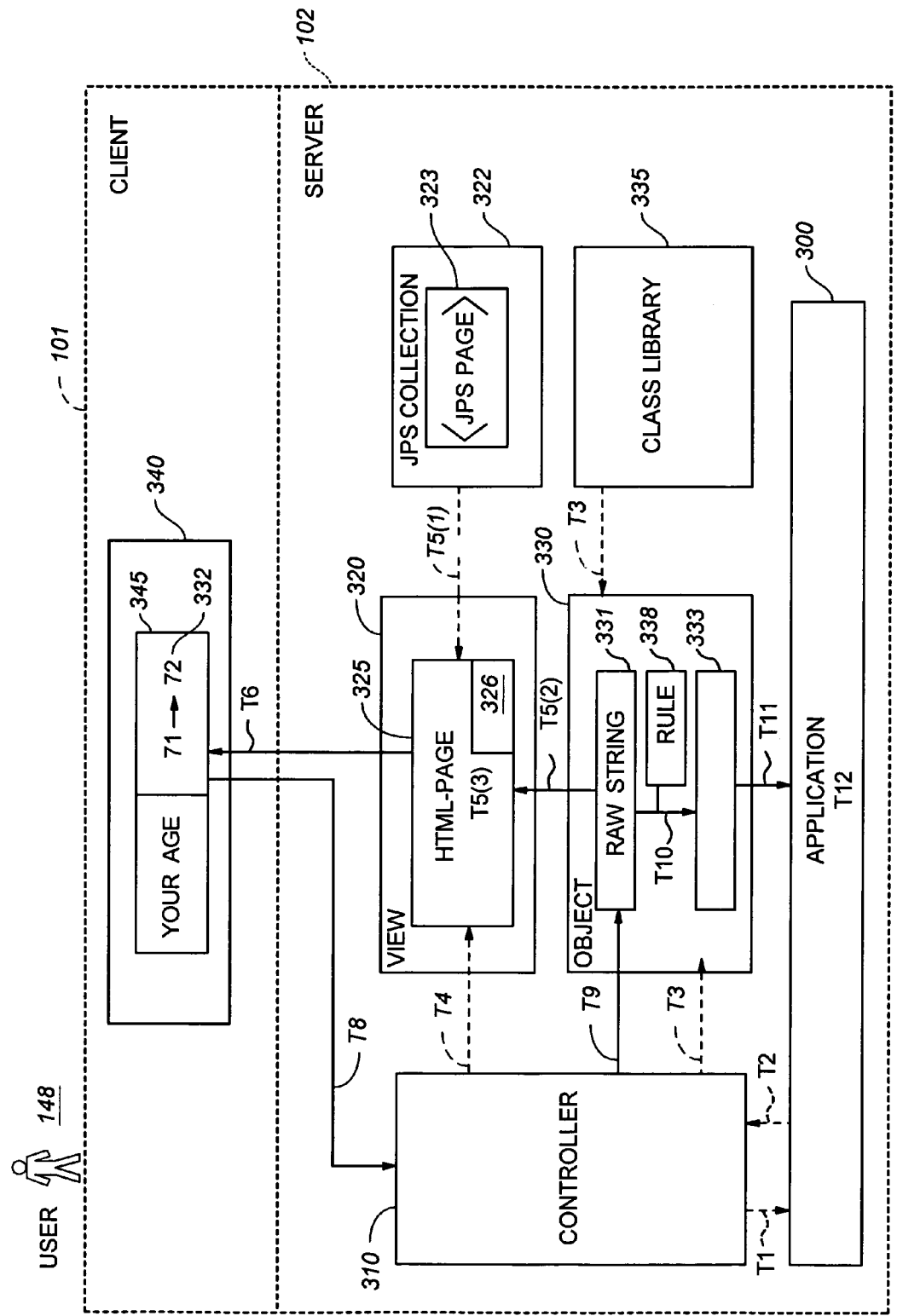
FIG._3

(1) <html>

(2) <head>

(3) </head>

(4) <body>

(5) YOUR AGE < input type = "text" ID = "<%=obj.id%>" value = "<%= obj.rawstring%>" </input>

(6) <body>

(7) </html>

FIG._4

(1) <html>

(2) <head>

(3) </head>

(4) <body>

(5) YOUR AGE <input type = "text" ID = "id0" value = "71" </input>

(6) <body>

(7) </html>

FIG. _5

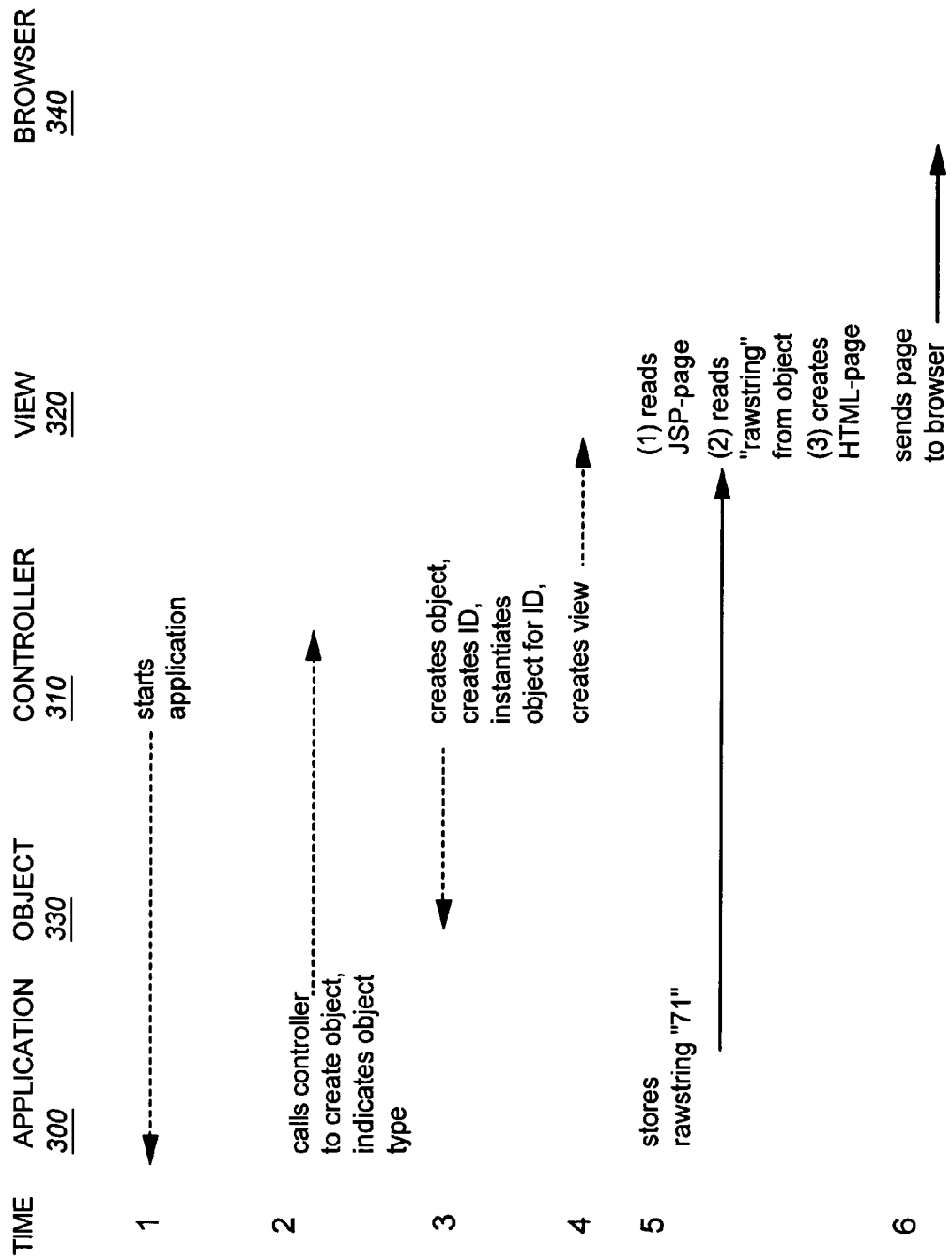
FIG. — 6A

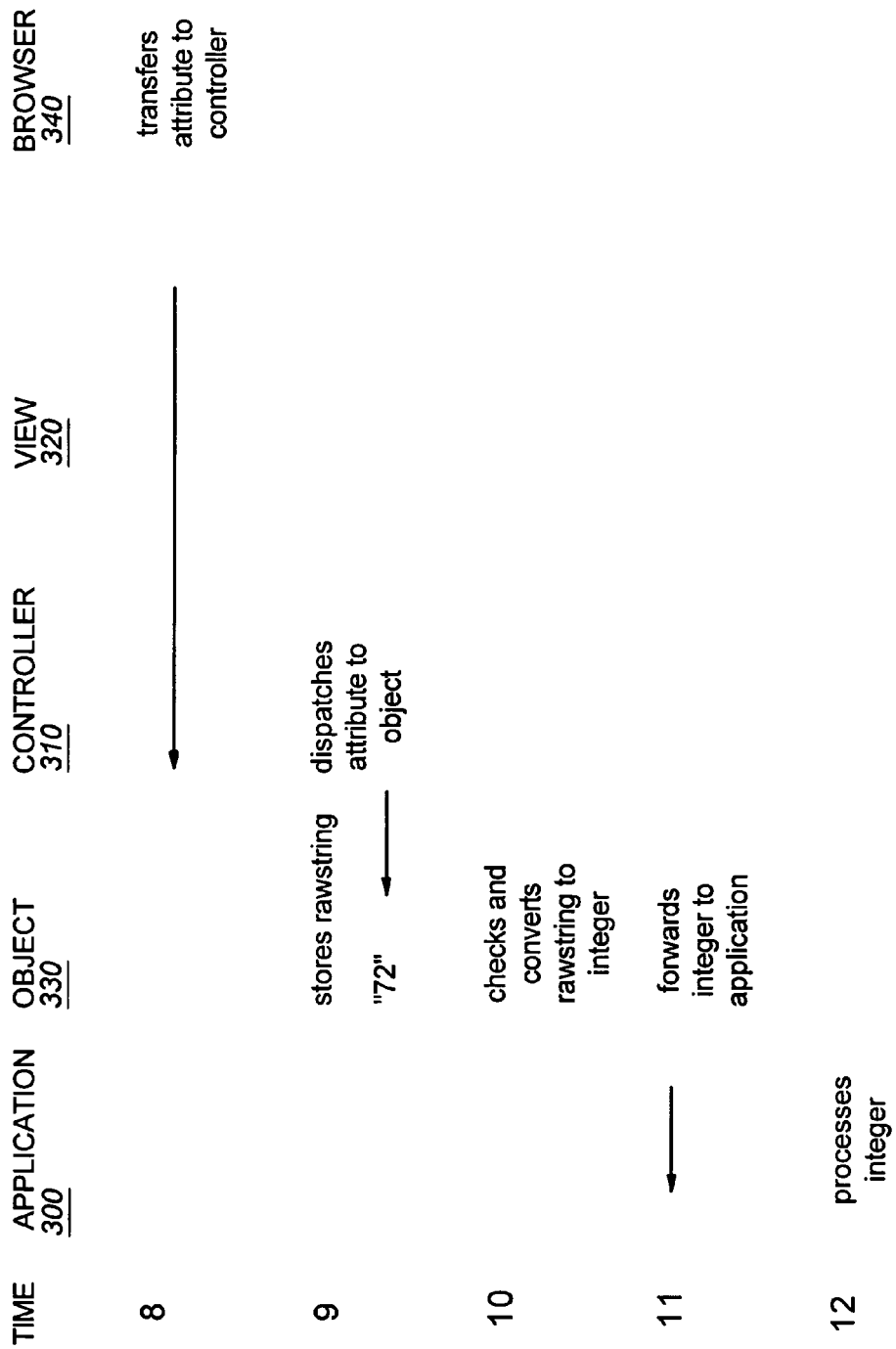
FIG._6B

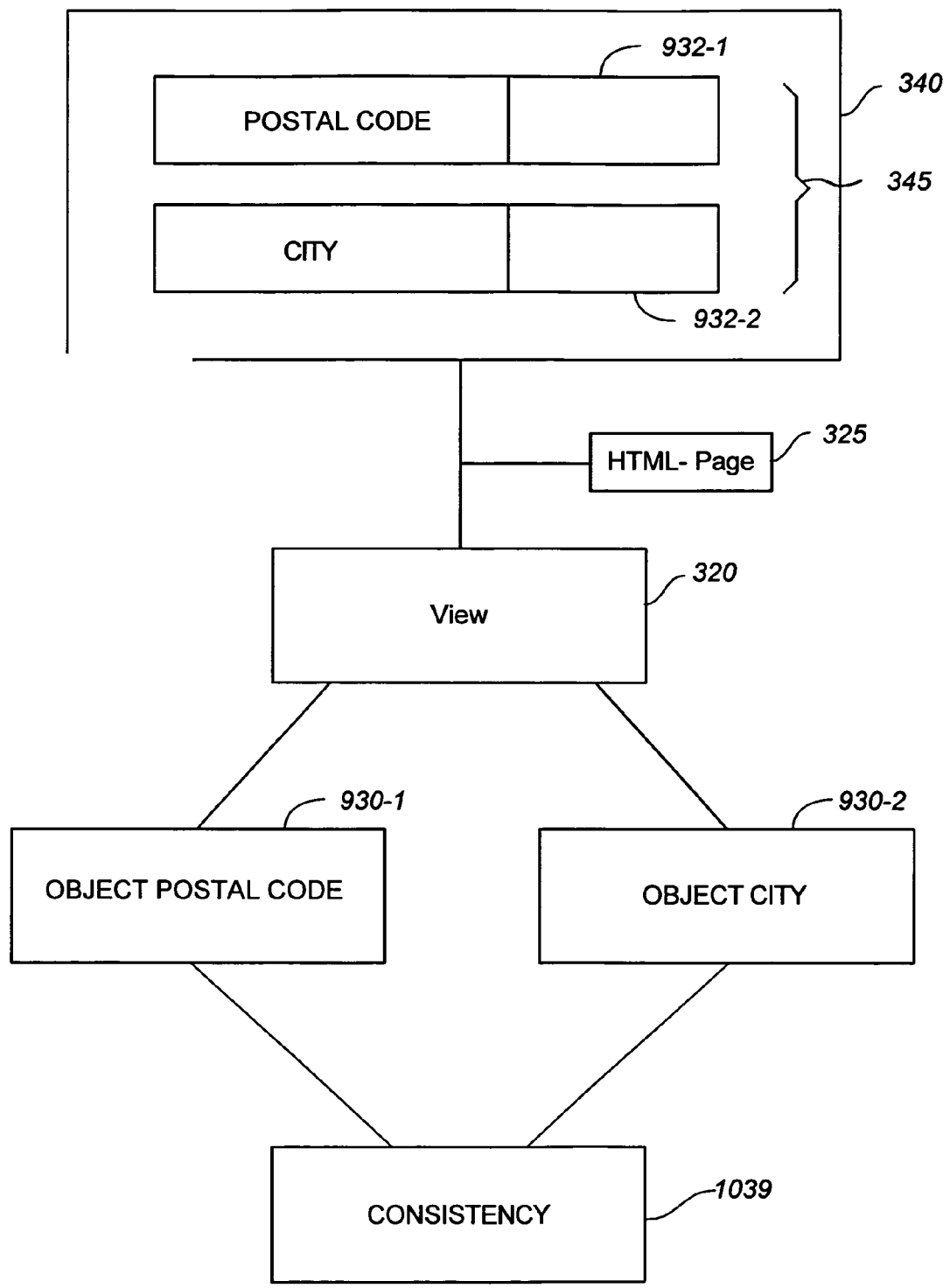
FIG._9

CAPTURING DATA OF PREDEFINED TYPE FROM USER

CROSS REFERENCE TO RELATED APPLICATIONS

This application is a continuation-in-part of International Application PCT/EP02/06519, with an international filing date of Jun. 13, 2002, which claims priority to U.S. Patent Application No. 60/305,809, filed Jul. 16, 2001.

BACKGROUND

The present invention relates to electronic data processing, and more particularly, to client-server computer communication.

In client-server systems, a client and a server communicate using network protocols, for example, HTTP (Hypertext Transfer Protocol) and TCP/IP (Transmission Control Protocol/Internet Protocol). Generally, a user of the client enters data; the client and the network forward the data to the server; and an application running on the server processes the data or forwards the data to another server (e.g., a database server) for processing. HTTP is a stateless protocol, meaning that the server keeps no record of previous interactions with the client. The server processes each interaction independently of previous interactions.

One example of a client-server system is the Internet. In the Internet scenario, a large number of clients communicate with a single server; each client is equipped with a browser. Standard browsers are commercially available (e.g., Microsoft Explorer, Netscape Navigator). For each particular application, the server instructs the browser by a page in a markup language. For example, an HTML(Hypertext Markup Language) page causes the browser to display an input mask that prompts the user to enter data. Often, the input mask provides representations of the data in a particular format ("transfer format"). However, the application processes the data in another format "process format"). For example, the application conveniently uses positive integers to process the age of a person and uses strings for names.

As with all human-to-computer interaction, human errors cannot be excluded; checking the data entered by the user is therefore advantageous. In practice, the input mask invites the user to input a large number of data items such as name, address, age, or other content. The error probability rises with the number of data items.

Checking data ranges according to predefined rules is desirable as well. For example, the application uses the data item "age-of-a-person" as an integer number between 0 and 130. In other words, there are input constraints, and the rules correspond to these constraints.

Checking data consistency between different data items is desirable as well. Predefined rules exist, for example, for checking the consistency between phone dialing codes and city. The code "0621" belongs to the cities Mannheim and Ludwigshafen in Germany, but not to the city of Heidelberg. In case of input error, the user is invited to enter the data again; however, this is often accompanied by an unwanted loss of correct data items. For example, the user has typed a number of data items, one item of data needs correction, but the server instructs the browser to return an empty mask.

SUMMARY OF THE INVENTION

In general, in one aspect, the present invention provides methods and apparatus, including computer program products, for capturing data of a predefined type from a user. The techniques include sending a markup language page to a browser on a client; interpreting the markup language page by the browser to receive data from the user in a transfer format; transferring the data in the transfer format to an object on a server; storing the data by the object in the transfer format; converting the data from the transfer format to a process format by the object; checking the compliance of the data with a predefined rule by the object; and if the data complies with the predefined rule, forwarding the data in the process format by the object to the application; else, resending the markup language page to the browser with the data in the transfer format.

Advantageous implementations include one or more of the following features. The transfer format is a string format. The predefined rule is internal to the object. The predefined rule is external to the object. The techniques further include storing state information in permanent memory and restoring the object by using the state information. Restoring is delayed until transferring. Storing state information in permanent memory is performed by storing in hidden input fields in the page. The techniques further include maintaining on the client a copy of the markup language page that was previously sent. Resending the markup language page to the client includes identifying a portion of the markup language page that has changed since the markup language page was previously sent; and resending only the portion of the markup language page that has changed. The object is provided by a software framework running on the server; the software framework being external to the application. The techniques do not assume a particular programming language implementation. The techniques do not require any particular flow logic. The techniques do not assume a particular error handling scheme.

The invention can be implemented to realize one or more of the following advantages. Data received from a user can be maintained in multiple formats including a transfer format and a process format. The process format facilitates checking the compliance of the data with predefined rules. Data is forwarded to the application only in the case of data compliance. In the case where some but not all of the data is correct, the HTML-page is re-sent to the user for correction with the correct data items preserved. The server does not need to send the entire HTML-page back to the client. Thus, the required bandwidth for network communication can be lower when compared to prior art systems where the whole HTML-page is exchanged between the server and client.

In the case of non-availability of the server, the server can store state information in permanent memory and use the state information to restore objects that are used to store the data received from a user. The restoring can be delayed until the client has transferred the data to the server. This saves expensive usage of memory.

The data checking mechanism can be provided as part of a software framework that is separate from the application. Thus, the application need not implement the data checking mechanism; this functionality is automatically provided to the application by the framework.

The data checking mechanism does not need to be coded independently for each data type. When new data types are added, the data checking mechanism is automatically extended to cover the new data types.

The data checking mechanism is compatible with Internet protocols such as HTTP, HTTPS (HTTP over Secure Socket Layer), HTML, or XML(Extensible Markup Language).

The data checking mechanism can be implemented in any programming language. It is not dependent on a particular language implementation. It also does not assume any particular error handling scheme, or any particular flow logic.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 3 illustrates a block diagram of the system of FIG. 1 with more detail.

FIG. 4 illustrates a code listing of a JSP-page.

FIG. 5 illustrates a code listing of an HTML-page.

FIGS. 6A and 6B illustrate an action overview for a first implementation of the invention.

FIG. 9 illustrates a diagram of first and second data attributes with first and second objects, respectively, in a fourth implementation of the invention.

DETAILED DESCRIPTION OF THE INVENTION

For convenience of explaining a first implementation of the invention (shown in FIG. 1), the following assumptions are made:
(i) Server 102 is fully available all the time, in other words, all components in server 102 are fully operational;
(ii) Checking is only performed in object 130;
(iii) Checking is complete in the meaning that data has been checked according to a predefined number of rules and that successful checking makes the data ready for being processed by the application; and
(iv) There is only a single object 130 and single content (e.g., object for "age-of-a-person" only).

Figure 1:
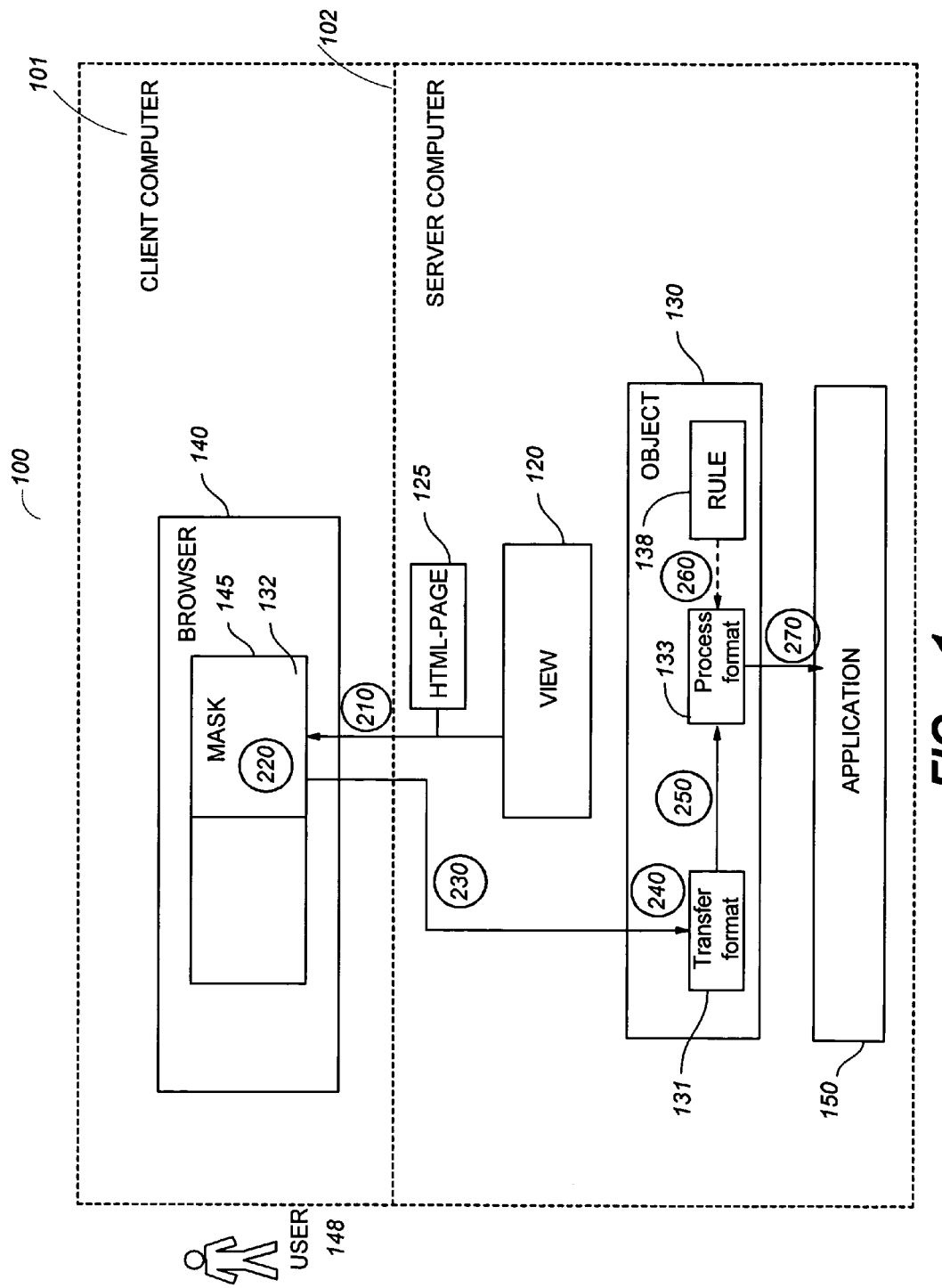
FIG. 1 illustrates a block diagram of a system according to an implementation of the invention.

As shown in FIG. 1, a system 100 in accordance with a first implementation of the invention includes a client 101 and a server 102. A client is one or more computers having a client relationship with a server. A server is one or more computers having a server relationship with a client computer. The client and server are generally remote from each other and typically interact through a communication network, e.g., a local area network ("LAN") or a wide area network ("WAN"), e.g., the Internet. The relationship of client and server arises by virtue of computer programs running on the respective computers and having a client-server relationship to each other.

In the system 100, the client 101 executes a browser 140 to interact with a user 148, and a server 102 executes an application 150. An application (also referred to as "model") is a computer program that processes data.

The server 102 also includes a view 120, a markup language page 125 "HTML-page"), an object 130, data attributes (in transfer format 131/132, in process format 133), and predefined rules 138. The object 130 is an object in the object-oriented programming sense. The view 120 generates HTML-pages 125.

The HTML-page 125 is a page that is received and processed by a client and generally displayed to a human user. In this specification, the term HTML collectively refers to any markup language such as HTML (Hypertext Markup Language), WML (Wireless Markup Language), and XML (Extensible Markup Language) that can be used to produce an HTML-page 125.

The object 130 contains data attributes (or "data") and procedures to manipulate the data. For example, an object can contain information about a person (e.g., age, name, address, phone number), which information is stored in the data attributes (e.g., "age-of-a-person"). A data attribute contains one or more stored values (e.g., a default value "71", and a user-specified value "72") of a given data format (e.g., integer, string, floating point, date, time). The procedures to manipulate the data include: store, convert, check, and forward.

Figure 2:
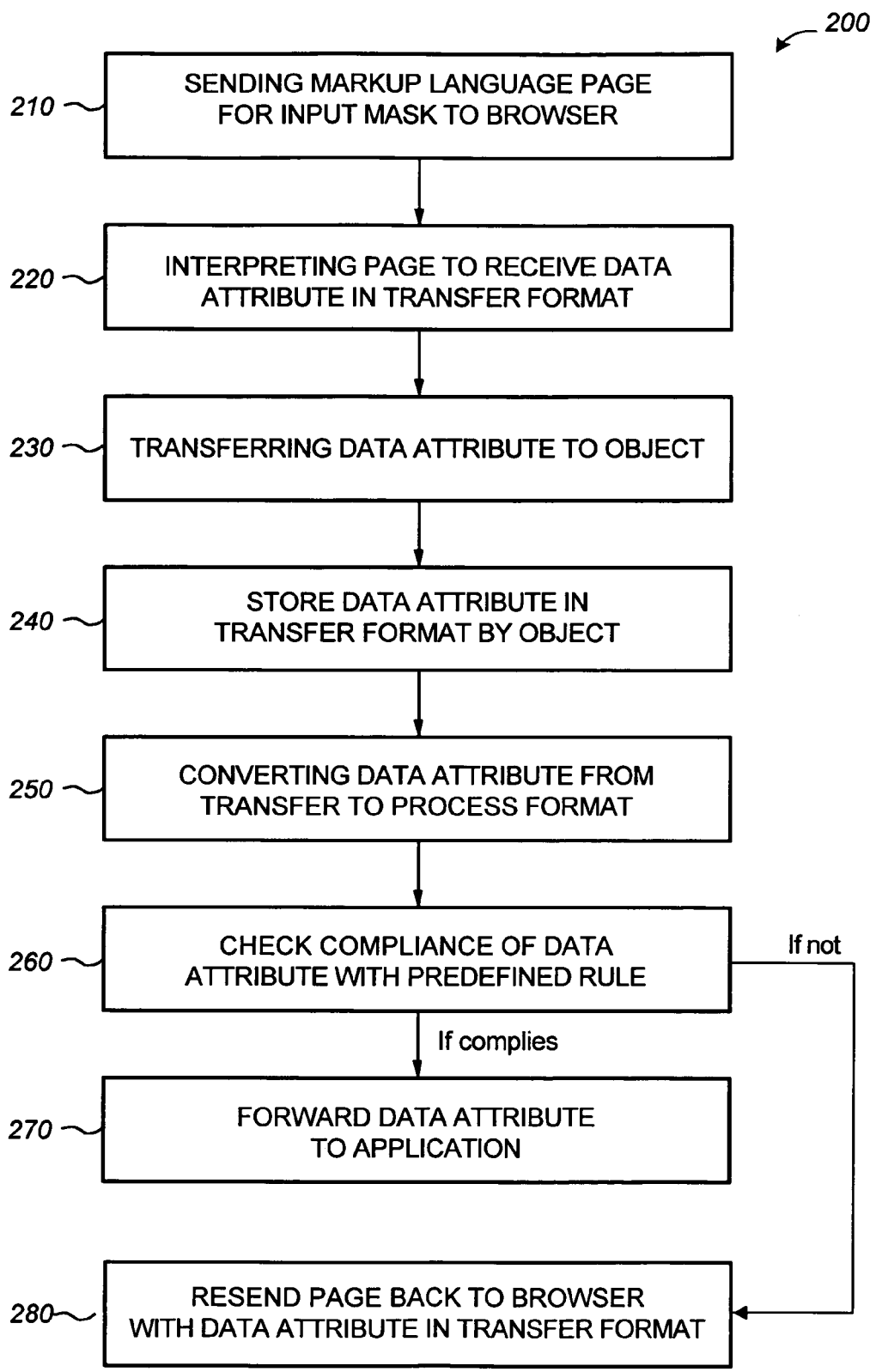
FIG. 2 illustrates a flow chart diagram of a method according to an implementation of the invention.

As shown in FIG. 2, a method 200 for capturing a data of a predefined type from user 148 is summarized by its main steps as follows: View 120 in server 102 sends markup language page 125 (HTML-page) for input mask 145 to browser 140 (step 210). Browser 140 interprets HTML-page 125 to receive data 132 from user 148, (data is in transfer format, e.g., string) (step 220). Browser 140 transfers data 132 to object 130 on server 102 (where reference number changes to 131) (step 230). Object 130 stores data 131 in transfer format (e.g., string), the object having a type that corresponds to the type of data (e.g., integer) (step 240). Object 130 converts data 131 to attribute 133 (from transfer to process format, e.g., string to integer) (step 250). Object 130 checks the compliance of data 133 (in process format) with predefined rule 138 (step 260). If the data complies, then object 130 forwards data 133 (in process format, e.g., integer) to application 150 (step 270).

In the case of non-compliance, the server 102 re-sends a further version of page 125 to the browser 140 so that the user 148 can correct the non-compliant data (step 280). The further version differs in content from the initial version. For example, instead of displaying an empty input mask, the further version displays an input mask that is filled with the data 131 (in transfer format) entered by the user. The further version can also contain error messages or markers (e.g., highlighting) that identify which data is non-compliant. The differences between the initial version and the further version will be referred to as deltas.

In one implementation, the server 102 does not re-send the entire page 125 during step 280. Instead, the server 102 sends only the deltas. The server 102 identifies the deltas using a delta-detection algorithm and sends the deltas to the browser 140 using a delta-handling protocol. One such delta-handling protocol involves using a writer function for object 130 to calculate the delta information. The writer function splits its output stream into two streams, one stream that contains the information that has changed and another stream that contains the information that has not changed.

Upon receiving the deltas for the page 125, the client updates a stored copy of the page 125 based on the deltas. The client then displays the updated page 125 in the browser 140.

In one implementation, the above described data checking and delta-handling techniques are provided by a software framework on the server. This server-side framework is external to the application 150. In the framework, the data checking mechanism is a task of the data type to which the data belongs. However, it does not need to be coded independently for each data type. Instead, when new data types are added, the data checking mechanism is automatically extended to cover the new data types.

A separate framework on the client-side includes data structures that maintain the state of page 125. The client-side framework also includes procedures that perform a variety of data management services. Such services include delta-handling, error handling, and user input help.

As shown in FIG. 3, the browser 340 includes an input mask 345. The object 330 includes rawstring 331, which is a data attribute in string format. The server 102 includes a controller 310, an identification number 326 for HTML-page 325, a JSP-collection 322 (with JSP-page 323), and a class library 335. The class library 335 is a collection of classes, preferably, stored on the server 102.

The controller 310 starts and stops method steps according to the present invention and transports data between system components (e.g., between the browser and view, between the object and the application). Controller actions or commands include "init", "create object", "create view", "create object", and "instantiate".

The JSP-collection 322 is a collection of JSP-pages 323. A JSP-page 323 is a markup language page, typically an HTML page, that contains additional bits of code that execute application logic to generate dynamic content. In this specification, the term JSP collectively refers to any technology that can be used to create JSP-pages 323. Such technologies include JSP (JavaServer Pages™), BSP (SAP Business Server Pages), ASP (Microsoft Active Server Pages), and ADP (AOLserver Dynamic Pages).

An example of a JSP-page 323 is shown in FIG. 4. Line 5 of the JSP-page 323 contains tag notation, <%=obj.rawstring%>, that generates dynamic content, as further shown in FIG. 5. FIG. 5 is an example of an HTML-page 325 that is produced by the example JSP-page 323 of FIG. 4. As shown, the tag notation has been replaced by a value, "age-of-a-person".

Figure 7:
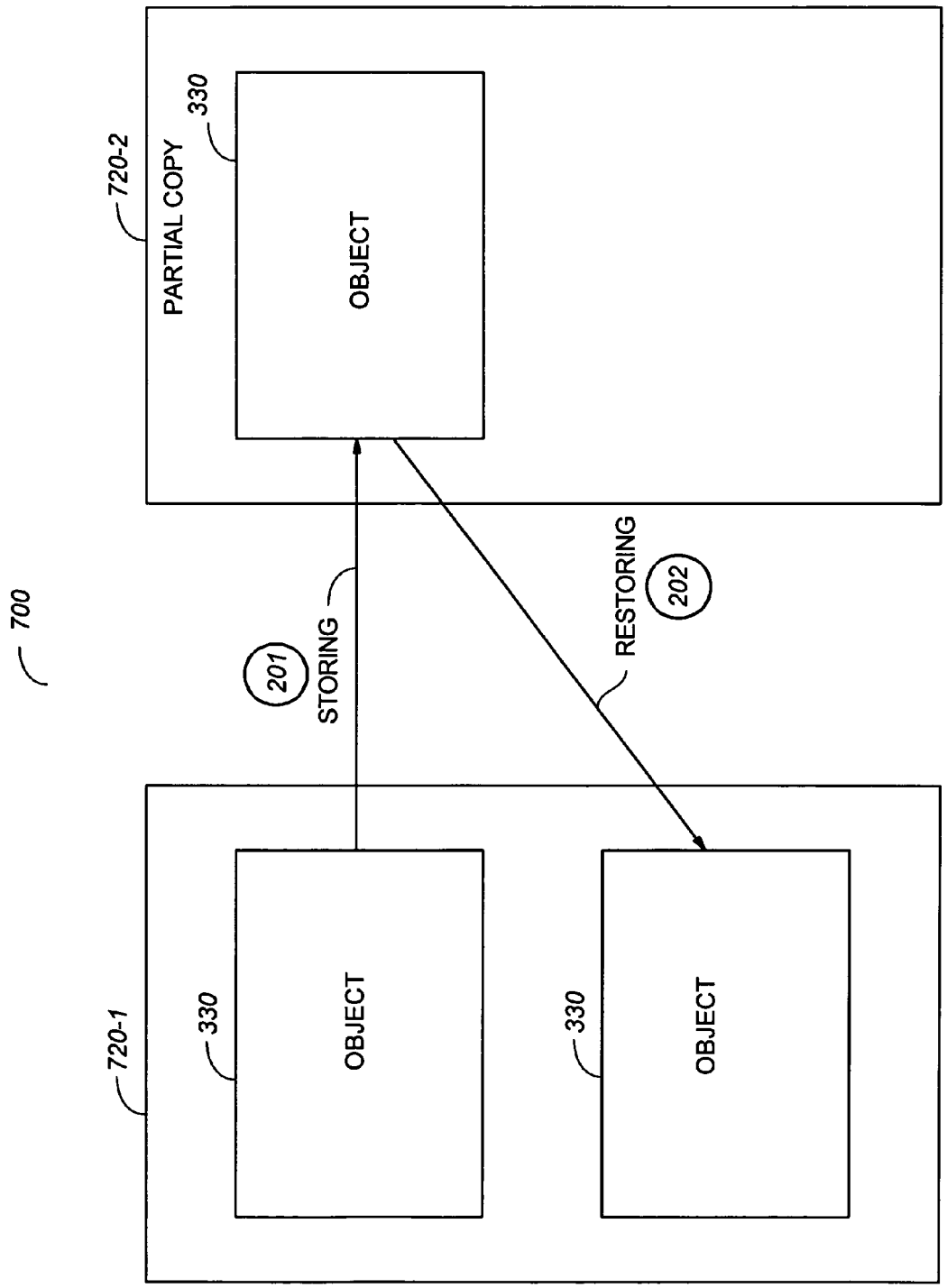
FIG. 7 illustrates a block diagram of a server for implementing a second implementation of the invention.

Referring to FIGS. 6-7, the first implementation is now explained by example. In 5 the figures, actions take place at consecutive time points (T1, T2 etc).

T1: Controller 310 starts application 300. For example, controller 310 issues a command "init".

T2: Application 300 calls controller 310 with the command "create object" (ID not known to application). Application 300 thereby indicates the type of object 330 that is required by application 300, in the example the type "integer".

T3: Controller 310 instantiates object 330 in a memory that is commonly accessible by both application 300 and object 330. Object 330 has ID=id and is of type "integer". In the example, the attribute has a predefined value, here "71".

T4: Controller 310 creates view 320, preferably, by issuing the command "create view".

T5: Controller 310 causes view 320 to do the following:
(1) View 320 reads predefined JSP-page 323 from JSP-collection 322.
(2) View 320 reads the data "rawstring" 331 in transfer format from object 330. In the example, the "rawstring" has the value "71". Having a predefined value (for presenting to user 148) is convenient, but not required.
(3) View replaces the tag notation in JSP-page 323 by the data "rawstring" to create HTML-page 325.

T6: View 320 sends HTML-page 325 to browser 340 (in client computer 101).

T7: Browser 340 interprets HTML-page 325 to render input mask 345. Input mask 345 has a text field (shown left) and an input field (shown right). The text field shows "YOUR AGE"; and the input field shows "71". Thereby, mask 345 prompts user 148 to modify the "71". The user changes to "72".

T8: Browser 340 transfers data "72" to controller 310 on server 102 (transfer response).

T9: Controller dispatches new data 333 (e.g., "72") to object 330 so that object 330 stores new data 331/332 (e.g., "72" replacing "71").

T10: Object 330 checks and converts rawstring "72" to integer (converting data 331 to data 333). In case of non-integer, attempted converting would result in an error message. Checking follows predefined rule 338 (here in the example: "Does raw-string only include digits 0, 1, 2, 3, . . . , 9?").

T11: Object 330 forwards data 333 (e.g., integer) to application 300. Capturing is now completed.

T12: Application 300 processes data 333. It is now possible to remove object 330.

Having described the actions without considering identifications was convenient for explanation. Identification becomes mandatory when more than a single object is used. Persons of skill in the art can provide identification. When sending commands and data, for example, the following identifications are conveniently used:

at T2 and at T11, controller 210 identifies the part of the application where the call originates, and where data 233 has to be forwarded to;

at T6, identification 226 is part of page 225;

at T8, the identification is part of the transfer response from browser 240; and at T9, controller 210 uses the identification to find object 230.

The assumptions for first implementation are not applicable all the time. Server 102 might not be fully available all the time; object 330 might need to use services external to object 330 for checking; checking might be incomplete; there might be multiple data items 331/332/333 and multiple objects 330. For convenience of explanation, further implementations are now explained where some of the above assumptions are modified. The modified assumptions will be marked with a prime marker (').

In a second implementation, the first assumption is modified, but other assumptions remain valid, that is:

(i') Server 102 is unable to store object 330 all the time. During a predetermined period corresponding to time points 6 through 8 of FIGS. 6A and 6B, server 102 does not store object 330. Nonavailability is known to controller 310 in advance;

(ii) checking is performed in object 330;

(iii) checking is complete;

(iv) there is only a single object 330.

As explained in connection with the first implementation, object 330 is needed at T5(2) by view 320 that reads old data 331 (i.e. rawstring "71"), and is needed again at T9 when controller 310 dispatches new data 333 (e.g., "72") to object 330. The following information is required for object 330 to resume operation at T9:

(a) type of object 330 (e.g., integer);

(b) identification 326 of object 330;

(c) rule 338 (e.g., "Does raw-string only include digits 0, 1, 2, 3, . . . , 9?"); and (d) the address (not shown) in application 300 where to forward data 333.

Information (a)(b)(c)(d) is also referred to as "state information".

FIG. 7 shows a server memory 700 for implementing the second implementation of the invention with memory portion 720-1 that is temporarily unavailable and memory portion 720-2 is permanently available. Memory portion 720-1 stores object 330 and—at a later time—stores restored object 330; memory portion 720-2 stores a partial copy of object 330.

In one implementation, the method 200 further includes the following steps, both invoked by controller 210: storing information (a)(b)(c)(d) in permanent memory portion 720-2 (step 201); restoring object 330 portion in memory 720-1 using the information from memory portion 720-2. Restoring uses class library 335. Preferably, steps 201 and 202 are executed after T5 (of FIG. 6A) and prior to T9 (of FIG. 6B).

As used herein, "permanently" refers at least to the time between steps 201 and 202. Portion 720-2 can be implemented in a variety of ways, such as by a hard disk on server 102, by a separate database server, or even by hidden input fields in page 325.

It is an advantage that restoring can be delayed until browser 340 has transferred data 332 to server 102 (T8). This saves expensive usage of memory portion 720-1.

Persons of skill in the art are able to extend the store-restore scheme to other components. Likewise, in case of non-availability of controller 310 or of application 300, identification has to be stored as well.

Temporarily storing state information requires further method steps. For each client, a separate object has to be created. Memory portion 720-1 of computer 102 is regarded as expensive because semiconductor memory (RAM) requires address space; memory portion 720-2 is cheaper. The second implementation optimizes costs by distributing the memory load over "cheap" and "expensive" memory.

For a third implementation, assumptions (i) and (i') of the first and second implementation are valid. Assumptions (iii) (checking complete) and (iv) (single object) are valid as well. Different from the first and second implementations is that (ii') checking is performed outside object 330.

Figure 8:
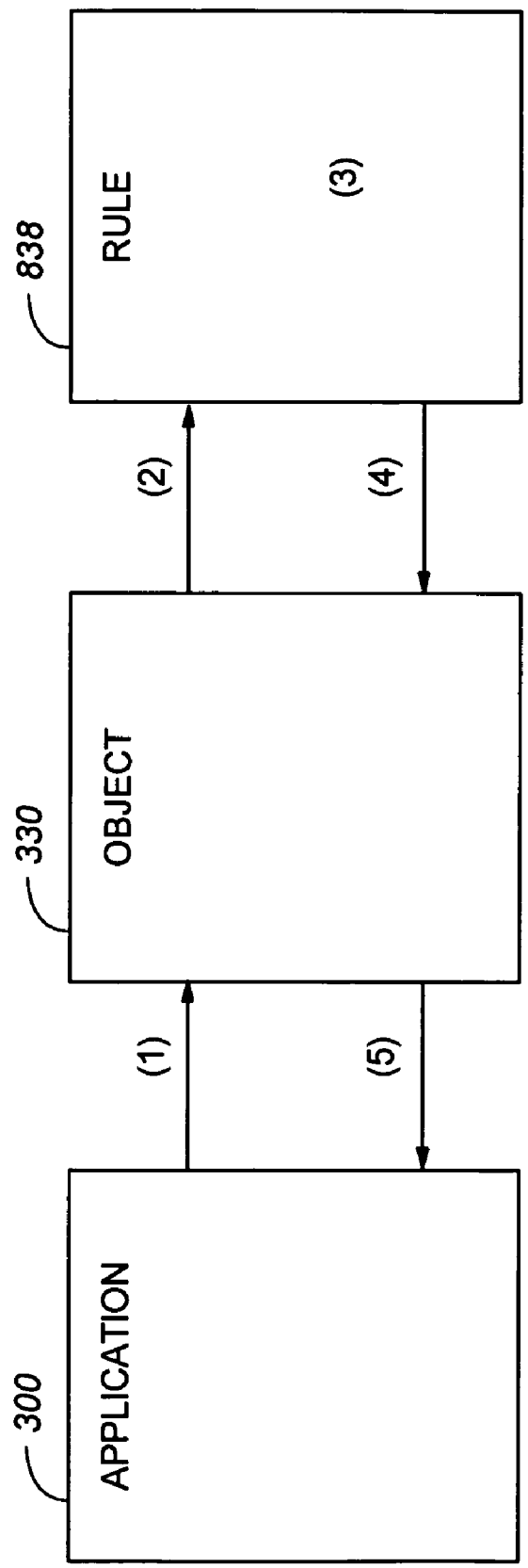
FIG. 8 illustrates a diagram of an object, a rule, and an application according to a third implementation of the invention.

FIG. 8 is a diagram of object 330, rule 838, and application 300 according to the third implementation. Rule 838 is similar to rule 338 with the exception that rule 838 is external to object 330. Optionally, rule 838 is part of application 300.

Rule 838 can access data in more than one data format. Depending on the implementation, rule 838 accesses the transfer format 331/332 or the process format 333 or both formats.

A data range check according to the third implementation proceeds as follows:
(1) Application 300 queries object 330 for validity/non-validity of data;
(2) Object 330 calls rule 838 and makes data available to rule 838 (i.e. integer);
(3) Rule 838 checks a range (e.g., integer for age-of-a-person larger than or equal to 0 and smaller than or equal to 130);
(4) Rule 838 indicates range compliance to object 330;
(5) Object 330 forwards range compliance to application 300.

Many variations of this scheme are possible. Performing a check by external role 838 alone is convenient, but not necessary; persons of skill in the art can perform both internal checking "generic", rule 338, FIG. 3) and external checking "non-generic", rule 838) in any order.

In one implementation, application 300, object 330, internal rule 338 and external rule 838 cooperate as follows:
(1) Application 300 queries object 330 for validity/non-validity of data; in this example, data is valid if it can be converted into process format "integer";
(2) Object 330 performs internal check with rule 338 and indicates validity;
(3) Application 300 requests a further check for data range at object 330;
(4) Object 330 calls rule 838 and makes the data available to rule 838;
(5) Rule 838 checks the range (e.g., integer larger than or equal to 0 and smaller than or equal to 130);
(6) Rule 838 indicates range compliance to object 330;
(7) Object 330 forwards range compliance to application 300; and
(8) Object 330 forwards data to application 300.

Without the need of further explanation herein, persons of skill in the art can adapt the scheme for non-compliance.

As mentioned in the background section, users typically input more than one data item into the input mask. Thus, assumption (iv') is now modified. In a fourth implementation of the present invention, there are multiple data items with corresponding multiple objects.

FIG. 9 is a diagram of first and second data attributes 932-1, 932-2 with first and second objects 930-1, 930-2, respectively, in the fourth implementation. In the example, input mask 345 in browser 345 has text fields for "POSTAL CODE" and "CITY" (content) and has input fields for data 932-1 and 932-2, respectively. Objects 930-1, 930-2 are corresponding to the content. Preferably, objects 930-1 and 930-2 use external rule 838 to check consistency of postal code and city.

As mentioned above, method 200 is a method for capturing data of a predefined type. Once the data is captured, the data is processed by application 300. In case of multiple data items (as in FIG. 9), capturing and processing can be combined as follows:
(1) Capturing a first data item, processing first data item, capturing a second data item, processing second data item; or
(2) Capturing first data item, capturing a second data item, processing a first data item, processing a second data item.

It is also possible to define the order for selected method steps (method 200 for all implementations).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network "LAN") and a wide area network "WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied in a machine-readable storage device, the computer program product comprising instructions operable to cause a data processing apparatus to perform operations on a server comprising:
   providing a server-side framework to an application on said server, the server-side framework comprising a controller and a view external to the application, the framework supporting a plurality of predefined data types, each data type having a predefined rule;
   receiving in the controller from the application a request for an object, the request indicating one of the plurality of predefined data types;
   creating, by the controller, the object in response to the request, the object storing a default value of the indicated data type, the default value being stored in the object in a transfer format and in a process format, the process format being different from the transfer format, wherein the controller causes the view to retrieve the default value in the transfer format from the object;
   generating a markup language page including the default value in the transfer format;
   sending, by the view, the markup language page to a browser on a client;
   receiving, in the controller, a user-supplied value in the transfer format from the browser, wherein the controller sends the user-supplied value to the object;
   replacing in the object the default value in the transfer format with the user-supplied value in the transfer format, the object automatically converting the user-supplied value from the transfer format to the process format, the object storing the user-supplied value in the process format, the object automatically checking the compliance of the user-supplied value in the process format with the predefined rule; and
   if the user-supplied value in the process format complies with the predefined rule, forwarding, by the object, the user-supplied value in the process format from the object to the application and otherwise the controller causes the view to automatically resend the markup language page to the browser with the user-supplied value in the transfer format.

2. The product of claim 1, wherein the transfer format is a string format.

3. The product of claim 1, wherein the predefined rule is internal to the object.

4. The product of claim 1, wherein the predefined rule is external to the object.

5. The product of claim 1, wherein the operations further comprise storing state information in permanent memory and restoring the object by using the state information.

6. The product of claim 5, wherein restoring is delayed until transferring.

7. The product of claim 5, wherein storing state information in permanent memory is performed by storing in hidden input fields in the page.

8. The product of claim 1, wherein resending the markup language page to the client includes:
   identifying a portion of the markup language page that has changed since the markup language page was previously sent; and
   resending only the portion of the markup language page that has changed.

9. The product of claim 1, wherein the instructions do not need to be in a particular programming language.

10. The product of claim 1, wherein the operations do not require any particular flow logic.

11. The product of claim 1, wherein the operations do not assume a particular error handling scheme.

12. The computer program product of claim 1, wherein the default value is a null value.

13. The method of claim 1, wherein resending the markup language page to the client includes:
   identifying a portion of the markup language page that has changed since the markup language page was previously sent using a writer function; and
   resending only the portion of the markup language page that has changed.

14. The method of claim 13, wherein the writer function outputs a plurality of information streams, wherein a first information stream contains information associated with the portion of the markup language page that has changed, and a second information stream contains information not associated with the portion of the markup language page that has changed, and wherein resending only the portion of the markup language page that has changed includes the second information stream.

15. The method of claim 1, further comprising:
applying an input mask to the markup language page sent to the browser on the client.

16. The method of claim 15, wherein resending the markup language page to the browser with the user-supplied value in the transfer format includes filling the input mask with the user-supplied value in the transfer format.

17. A computer-implemented method operable on a server in a client-server system, the method comprising:
providing a server-side framework to an application on said server, the server-side framework comprising a controller and a view external to the application, the framework supporting a plurality of predefined data types, each data type having a predefined rule;
receiving in the controller from the application a request for an object, the request indicating one of the plurality of predefined data types;
creating, by the controller, the object in response to the request, the object storing a default value of the indicated data type, the default value being stored in the object in a transfer format and in a process format, the process format being different from the transfer format, wherein the controller causes the view to retrieve the default value in the transfer format from the object;
generating a markup language page including the default value in the transfer format;
sending, by the view, the markup language page to a browser on a client;
receiving, in the controller, a user-supplied value in the transfer format from the browser, wherein the controller sends the user-supplied value to the object;
replacing in the object the default value in the transfer format with the user-supplied value in the transfer format, the object automatically converting the user-supplied value from the transfer format to the process format, the object storing the user-supplied value in the process format, the object automatically checking the compliance of the user-supplied value in the process format with the predefined rule; and
if the user-supplied value in the process format complies with the predefined rule, forwarding, by the object, the user-supplied value in the process format from the object to the application and otherwise the controller causes the view to automatically resend the markup language page to the browser with the user-supplied value in the transfer format.

18. The method of claim 17, further comprising maintaining on the client a copy of the markup language page that was previously sent and wherein resending the markup language page to the client includes:
identifying a portion of the markup language page that has changed since the markup language page was previously sent; and
resending only the portion of the markup language page that has changed.

19. The method of claim 17, wherein the default value is a null value.

20. A server computer system having at least one processor comprising:
means for providing a server-side framework to an application on said server, the server-side framework comprising a controller and a view external to the application, the framework supporting a plurality of predefined data types, each data type having a predefined rule;
means for receiving in the controller from the application a request for an object, the request indicating one of the plurality of predefined data types;
means for creating, by the controller, the object in response to the request, the object storing a default value of the indicated data type, the default value being stored in the object in a transfer format and in a process format, the process format being different from the transfer format, wherein the controller causes the view to retrieve the default value in the transfer format from the object;
means for generating a markup language page including the default value in the transfer format;
means for sending, by the view, the markup language page to a browser on a client;
means for receiving, in the controller, a user-supplied value in the transfer format from the browser, wherein the controller sends the user-supplied value to the object;
means for replacing in the object the default value in the transfer format with the user-supplied value in the transfer format, the object automatically converting the user-supplied value from the transfer format to the process format, the object storing the user-supplied value in the process format, the object automatically checking the compliance of the user-supplied value in the process format with the predefined rule; and
means for forwarding, by the object, the user-supplied value in the process format from the object to the application, if the user-supplied value in the process format complies with the predefined rule, and otherwise the controller causes the view to automatically resend the markup language page to the browser with the user-supplied value in the transfer format.

21. The apparatus of claim 20, further comprising means for maintaining on the client a copy of the markup language page that was previously sent and wherein the means for resending the markup language page to the client includes:
means for identifying a portion of the markup language page that has changed since the markup language page was previously sent; and
means for resending only the portion of the markup language page that has changed.

* * * * *